United States Patent
Bang et al.

(10) Patent No.: US 8,335,060 B2
(45) Date of Patent: Dec. 18, 2012

(54) HYBRID FAULT CURRENT LIMITER

(75) Inventors: Seung Hyun Bang, Busan (KR); Kwon Bae Park, Daejeon (KR); Jung Wook Sim, Cheongju (KR); Won Joon Choe, Cheongji (KR); Gyeong Ho Lee, Cheongju (KR)

(73) Assignee: LS Industrial Systems Co., Ltd., Anyang-si, Gyeonggi-do (KR)

( * ) Notice: Subject to any disclaimer, the term of this patent is extended or adjusted under 35 U.S.C. 154(b) by 37 days.

(21) Appl. No.: 13/038,283

(22) Filed: Mar. 1, 2011

(65) Prior Publication Data
US 2011/0261496 A1 Oct. 27, 2011

(30) Foreign Application Priority Data
Apr. 23, 2010 (KR) ........................ 10-2010-0038073

(51) Int. Cl.
*H02H 3/00* (2006.01)
*H02H 7/00* (2006.01)
H02H 3/08 (2006.01)
H02H 9/02 (2006.01)
(52) U.S. Cl. .......................................... 361/2; 361/93.1
(58) Field of Classification Search ............. 361/2, 93.1
See application file for complete search history.

(56) References Cited

U.S. PATENT DOCUMENTS

| | | | | |
|---|---|---|---|---|
| 3,739,192 A * | 6/1973 | Oswald | | 361/3 |
| 4,740,858 A * | 4/1988 | Yamaguchi et al. | | 361/4 |
| 5,210,674 A * | 5/1993 | Yamaguchi et al. | | 361/19 |
| 5,953,189 A * | 9/1999 | Abot et al. | | 361/13 |
| 6,643,112 B1 * | 11/2003 | Carton et al. | | 361/152 |
| 7,079,363 B2 * | 7/2006 | Chung | | 361/13 |
| 2009/0195954 A1 | 8/2009 | Sim et al. | | |

* cited by examiner

*Primary Examiner* — Dharti Patel
(74) *Attorney, Agent, or Firm* — Lee, Hong, Degerman, Kang & Waimey

(57) ABSTRACT

The present invention is related to a hybrid fault current limiter comprising a switching unit detaching a moving contact located on a cable and transmitting a trip signal if a fault current is flowed at an electric power system, a semiconductor switching unit connected in series with the switching unit and configured to be turned off to limit the flow of the fault current when the trip signal is transmitted, and a circuit breaking unit connected in parallel to the switching unit and the semiconductor switching unit and configured to limit the fault current detoured from the switching unit and the semiconductor switching unit. The present invention provides rapid treatment for the fault current problem by applying the algorithm sensing the occurrence of the fault current and the algorithm limiting the fault current simultaneously.

8 Claims, 2 Drawing Sheets

HYBRID FAULT CURRENT LIMITER

CROSS-REFERENCE TO RELATED APPLICATIONS

Pursuant to 35 U.S.C. §119(a), this application claims the benefit of earlier filing date and right of priority to Korean Application No. 10-2010-0038073, filed on Apr. 23, 2010, the contents of which are hereby incorporated by reference herein in their entirety

BACKGROUND OF THE INVENTION

1. Field of the Invention

The present invention relates generally to a hybrid fault current limiter and, more particularly, to a hybrid fault current limiter sensing and limiting a fault current that occurs in an electric power system.

2. Description of the Related Art

A fault current limiter is a means of detecting a fault current and limiting the current to a normal level within several seconds, using a superconductor as a current limiting device which has substantially no resistance until certain up to a predetermined current value but rapidly represents a high resistance over a predetermined current value to limit the conducting current.

The fault current limiter is concentrated with a huge amount of energy due to resistance generated by the superconductor, such that energy consumption of the superconductor increases as the voltage applied to the superconductor increases.

Thus, to minimize the energy consumption of the superconductor, a large number of the superconductors is needed which leads to increasing the manufacturing cost. As a total volume increases in accordance with use of huge number of the superconductors, thereby increasing the installation and cooling cost.

The hybrid fault current limiter using a fewer numbers of superconductors or the conventional method is suggested to solve the problem, but the suggestion has failed to solve the price problem.

SUMMARY OF THE INVENTION

Accordingly, an object of the present disclosure is to provide a hybrid fault current limiter.

In one general aspect of the present invention, the hybrid fault current limiter comprises: a switching unit detaching a moving contact located on a cable and transmitting a trip signal if a fault current is flowed at an electric power system;

a semiconductor switching unit connected in series with the switching unit and configured to be turned off to limit the flow of the fault current when the trip signal is transmitted; and a circuit breaking unit connected in parallel to the switching unit and the semiconductor switching unit and configured to limit the fault current detoured from the switching unit and the semiconductor switching unit.

Further, in some exemplary embodiments, the hybrid fault current limiter may further comprise a dividing unit, which is connected in parallel with the switching unit and the semiconductor switching unit, and provides a shunt route for the fault current.

In some exemplary embodiments, the dividing unit may absorb the fault current as much as previously set.

In some exemplary embodiments, the hybrid fault current limiter may further comprise an accident sensor transmitting an open trip signal when the fault current flows in by accident, and the switching unit detaches the moving contact when the open trip signal is received.

In some exemplary embodiments, the switching unit may include a switching device which is turned on when the open trip signal from the accident sensor is received, a moving coil generating a magnetic field in response to the turn-on operation of the switching device, an electromagnetic repulsive plate moving far from the moving coil in accordance with the magnetic field, and a controller generating and transmitting the trip signal to the semiconductor switching unit.

In some exemplary embodiments, the switching unit may include power supply means providing a current to the moving coil when the switching device is turned on.

In some exemplary embodiments, the moving contact is connected in series on the cable between the accident sensor and the semiconductor switching unit, and connected to the electromagnetic repulsive plate thus able to operate as the state of open or short in order to apply or shut the current according to the movement of the electromagnetic repulsive plate.

In some exemplary embodiments, the switching device may be turned off in a normal state.

In some exemplary embodiments, the semiconductor switching unit may be turned on in a normal state.

DETAILED DESCRIPTION OF THE INVENTION

The preferred embodiment of the present invention will be more clearly described with the accompanying drawings. To describe the present invention, related conventional function or specific description of the composition can be omitted if it is considered as dilutive for the object of the present invention.

Figure 1:
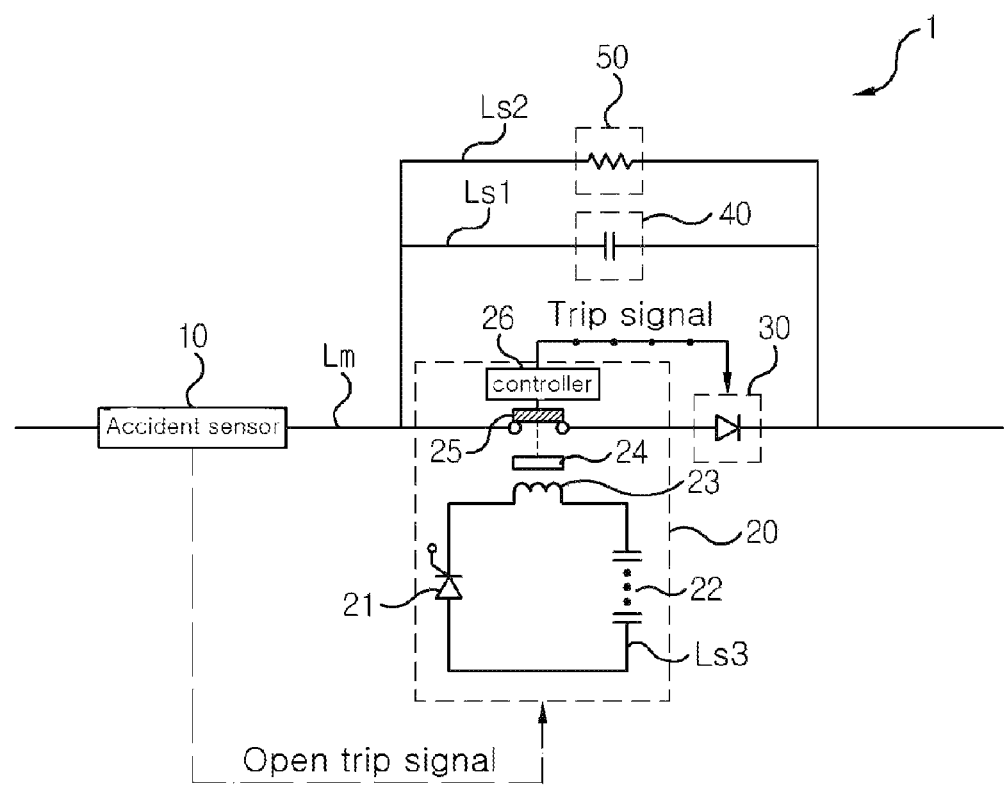
FIG. 1 is a block diagram of a hybrid fault current limiter according to an exemplary embodiment of the present invention.

FIG. 1 is a block diagram of a hybrid fault current limiter according to an exemplary embodiment of the present disclosure.

Referring to FIG. 1, the hybrid fault current limiter 1 comprises an accident sensor 10, a switching unit 20, a semiconductor switching unit 30, a dividing unit 40 and a circuit breaking unit 50.

And, the hybrid fault current limiter 1 comprises a main circuit Lm which is a connection in series of the accident sensor 10, the switching unit 20 and the semiconductor switching unit 30, a first auxiliary circuit Ls1 and a second auxiliary circuit Ls2. A first auxiliary circuit Ls1 and a second auxiliary circuit Ls2 comprise the dividing unit 40 and the circuit breaking unit 50 connected in parallel with the main circuit Lm above.

The accident circuit 10 generates and transmits an open trip signal to the switching unit 20 when a fault current is flowed in accordance with the accident occurred in an electric power system.

More specifically, the accident circuit 10 senses a magnitude of the current flowing in the electric power system and compares the sensed current value and a standard value previously set. If the sensed current value is higher than the standard value, the accident sensor considers the accident has occurred in electric power system and therefor generates and transmits the open trip signal to the switching unit 20.

The switching unit 20 comprises a switching device 21, power supply means 22, a moving coil 23, an electromagnetic repulsive plate 24, a moving contact 25 and a controller 26.

The switching unit 20 also comprises a third auxiliary circuit Ls3 which is a connection in series of the switching device 21, the power supply means 22, the moving coil 23.

The switching device 21 is turned off in the normal state to cut off the current flowing the third auxiliary circuit Ls3, and is turned on to allow the current to flow the third auxiliary circuit Ls3 when the open trip signal from the accident sensor 10 is received.

The power supply means 22 is a means of providing a current to the moving coil 23 when the switching unit 21 is turned on, and may include a capacitor.

The capacitor above discharges the current charged in accordance with the turn-on operation of the switching unit 21 and transmits the current to the moving coil 23.

As the switching device 21 is turned on, the switching device 21, the power supply means 22 and the moving coil 23 form a closed circuit to allow a current to flow on the third auxiliary circuit Ls3.

The moving coil 23 generates a magnetic field when the current is provided from the power supply means 22, and the magnetic field generates the repulsive force to the electromagnetic repulsive plate 24.

The electromagnetic repulsive plate 24 is located at the opposite side of the moving coil 23, and moves far from the moving coil 23 when an eddy current is applied by the magnetic field generated by the moving coil 23.

The electromagnetic repulsive plate 24 is composed of a light and highly conductive metal to make the induction of the eddy current more easily.

The moving contact 25 is connected in series with the main circuit Lm located between the accident sensor 10 and the semiconductor switching unit 30, and is mechanically connected with the electromagnetic repulsive plate 24. Thus, the moving contact 25 operates as open state to cut off the current flowing in the main circuit Lm when the electromagnetic repulsive plate 24 moves far from the moving coil 23.

On the contrary, if the magnetic field is not generated from the moving coil 23, the electromagnetic repulsive plate 24 returns to the initial location, i.e., the opposite side of the moving coil 23, and the moving contact 25 closed according to the movement of the electromagnetic repulsive plate 24, to allow the current to flow in the main circuit Lm.

The controller 26 is a microcomputer controlling the switching unit 20, which detects the state of the moving contact 25 and generates and transmits the trip signal to the semiconductor switching unit 30 when the moving contact 25 is considered as the open state.

The semiconductor switching unit 30 is connected in series with the switching unit 20 on the main circuit Lm. It maintains the turned on state at the normal state and changed to the turned-off state when the trip signal is transmitted from the controller 26 at the switching unit 20.

More precisely, when the accident occurs in the electric power system and the fault current is flowed, the moving contact 25 is detached by the cut-off operation of the switching unit 20, and the trip signal is transmitted to the semiconductor switching unit 30 at an instant.

And, when the moving contact 25 is detached, an arc current is generated across the moving contact 25, thus the semiconductor switching unit 30 is turned off to cut off the arc current that flows across the moving contact 25.

Here, an arc resistance is generated across the moving contacts 25 according to the change of the moving contact from the closed state to the opened state, and the arc current is a current which flows continuously in accordance with the arc resistance.

Because of the arc resistance, the current still flows across the moving contact 25, thus the cable on the main circuit Lm cannot be fully opened.

Thus, the hybrid fault current limiter 1 operates the semiconductor switching device 30 to be turned off to make the current zero to cut off the arc current in an early stage, which means that the fault current can be cut off at high speed.

The dividing unit 40 is a means of providing a shunt route to the fault current, and is connected in parallel with the series circuit composed with the switching unit 20 and the semiconductor switching unit 30. The dividing unit 40 may include condensers or resistors.

More specifically, the dividing unit 40 limits the fault current by absorbing the fault current for the capacity previously set, when the fault current detours according to the switching unit 20 and the turn-off operation of the semiconductor switching device 30.

That is, the dividing unit 40 generates the impedance and protects the semiconductor switching device 30 from the high voltage until the turn off operation of the semiconductor switching unit 30 is completed.

The circuit breaking unit 50 is connected in parallel with the series circuit composed with the switching unit 20 and the semiconductor switching unit 30, and is composed with the device which has impedance such as reactor, semiconductor device, resistance or fuse to limit the flow of the fault current detoured by the cut off operation of the switching unit 20 and the semiconductor switching unit 30.

In other words, if the dividing unit 40 absorbed the fault current fully until the set value thus incapable to absorb the fault current more, the fault current detours to the circuit breaking unit 50, and the circuit breaking unit 50 operates to cut off the flow of the fault current.

Figure 2:
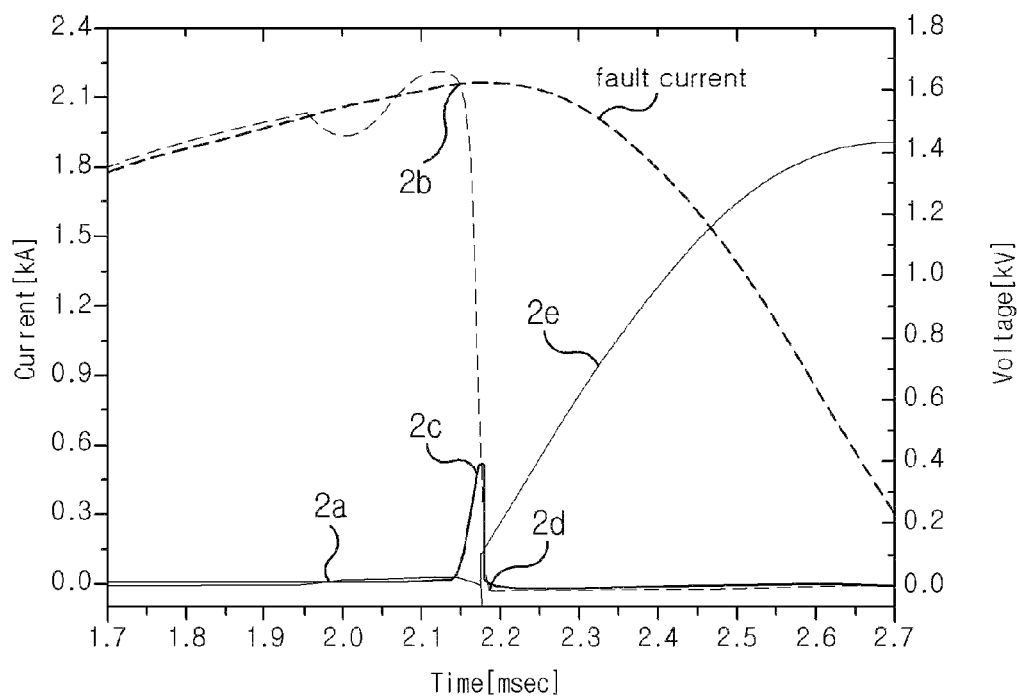
FIG. 2 is a graph representing an experimental result of the hybrid fault current limiter of FIG. 1.

FIG. 2 is a graph representing the experimental result of the hybrid fault current limiter of FIG. 1.

Referring to FIG. 1, when the hybrid fault current limiter 1 operates in the normal state, the semiconductor switching unit 30 is turned on, and the current flows across the main circuit Lm which includes the shorted moving contact 25 at the switching unit 20 and the semiconductor switching unit 30 stably.

But when the fault current is flowed, the accident sensor 10 senses the occurrence of the accident and transmits the open trip signal to the switching unit 20, thus the switching device 21 in the switching unit 20 is turned on.

By the turn-on operation of the switching device 21, the moving coil 23 generates the electromagnetic force and it moves the electromagnetic repulsive plate 24 far from the moving coil 23, thus the moving contact 25 connected mechanically with the electromagnetic repulsive plate 24 operates as open state.

When the moving contact 25 is detached (2a of FIG. 2 is the voltage of the moving contact 25 when it is opened), the fault current flowing across the main circuit Lm is cut off, and the fault current detours to the dividing unit 40 and the circuit breaking unit 50. Thus the fault current is primarily limited.

Meanwhile, when the moving contact 25 is opened, an arc current is generated across the moving contact 25, thus the semiconductor switching unit 30 is operated to be turned off (2b of FIG. 2 is the current when the semiconductor switching unit 30 switches with the high speed; by the high speed switching operation the current falls to the value of zero rapidly) to cut off the arc current that flows across the moving contact 25. Thus the fault current is finally limited.

And, when the semiconductor switching unit 30 switches with the high speed, it generates the high switching frequency and the impedance value of the dividing unit 40 is relatively smaller, therefor the fault current detours to the dividing unit 40 (and the dividing unit 40 absorbs the fault current), so as a result the semiconductor switching unit 30 is protected from the high voltage at the high speed switching time (2b of FIG. 2).

Moreover, full voltage generated after the turn-off operation of the semiconductor switching unit 30 is completed (2d of FIG. 2), i.e. after the complete cut off of the fault current flowing the main circuit Lm, is applied to the moving contact 25 (2e of FIG. 2 is the voltage applied to the moving contact 25 which increases as the time passes), thus semiconductor switching unit 30 is protected from the high voltage after the turn off operation of the semiconductor switching unit 30 is completed.

Here, the full voltage applies only to the moving contact 25 because the resistance of the moving contact 25 is relatively larger than the resistance of the semiconductor switching unit 30 albeit the moving contact 25 and the semiconductor switching unit 30 being both opened.

As the dividing unit 40 absorbs the fault current, the impedance of the dividing unit 40 increases, whereby the fault current flows to the circuit breaking unit 50, and the circuit breaking unit 50 limits the fault current.

The foregoing description of the preferred embodiment has been presents for the purpose of illustration and description. It is not intended to limit the scope of the invention. Still other variations and modifications are possible without departing from the spirit and scope of the present invention.

What is claimed is:

1. A hybrid fault current limiter comprising:
   a switching unit configured to detach a moving contact located on a cable and transmit a trip signal if a fault current flows in an electric power system;
   a semiconductor switching unit connected in series with the switching unit and configured to be turned off when the trip signal is transmitted;
   a circuit breaking unit connected in parallel to the series connection of the switching unit and the semiconductor switching unit and configured to limit the fault current from the switching unit and the semiconductor switching unit; and
   an accident sensor configured to generate and transmit an open trip signal when the fault current flows, wherein the switching unit comprises:
      a switching device configured to be turned on when the open trip signal is transmitted from the accident sensor;
      a moving coil configured to generate a magnetic field according to the switching device being turned on;
      an electromagnetic repulsive plate configured to move far from the moving coil according to the magnetic field; and
      a controller configured to generate and transmit the trip signal to the semiconductor switching unit when the moving contact is detached.

2. The hybrid fault current limiter of claim 1, further comprising a dividing unit connected in parallel to the series connection of the switching unit and the semiconductor switching unit and configured to provide a shunt route for the fault current.

3. The hybrid fault current limiter of claim 2, wherein the dividing unit is further configured to absorb the fault current as much as previously set.

4. The hybrid fault current limiter of claim 1, wherein the switching unit is further configured to detach the moving contact when the open trip signal is transmitted.

5. The hybrid fault current limiter of claim 1, wherein the switching unit comprises a power supply means configured to provide a source current to the moving coil when the switching device is turned on.

6. The hybrid fault current limiter of claim 1, wherein the moving contact is connected in series between the accident sensor and the semiconductor switching unit and connected to the electromagnetic repulsive plate such that the moving contact opens or closes the connection between the accident sensor and the semiconductor switching unit according to movement of the electromagnetic repulsive plate.

7. The hybrid fault current limiter of claim 1, wherein the switching device is turned off in a normal state.

8. The hybrid fault current limiter of claim 1, wherein the semiconductor switching unit is turned on in a normal state.

* * * * *